Nov. 29, 1966 R. M. PAGE 3,289,201
RADAR SYSTEM WITH PHASE COHERENT INTERMEDIATE
FREQUENCY SIGNALS
Filed Sept. 7, 1949 4 Sheets-Sheet 1
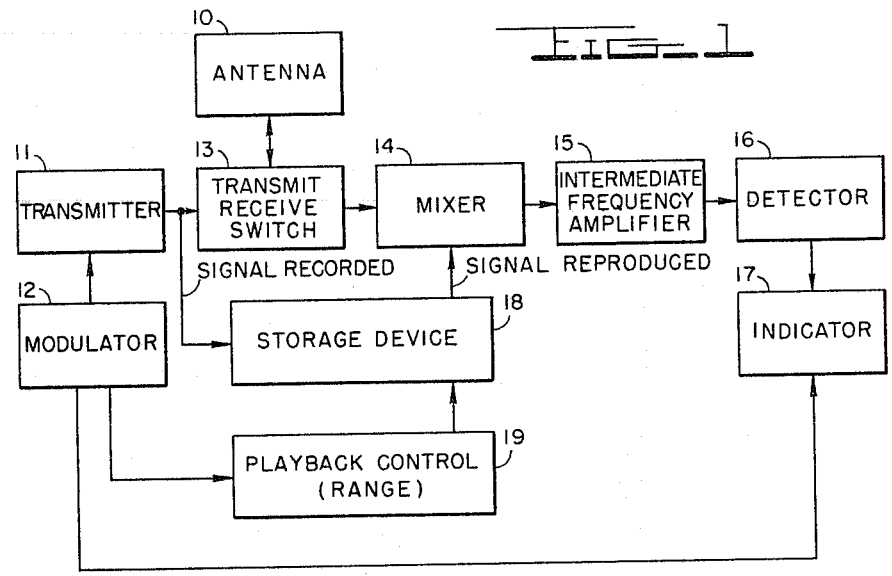
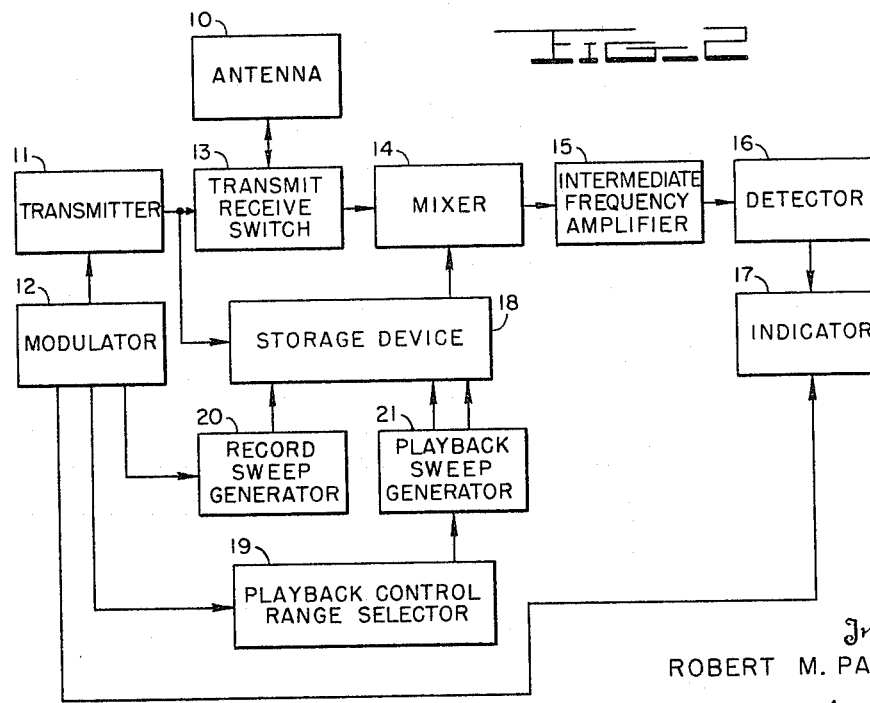
Inventor
ROBERT M. PAGE
By M. A. Hayes
ATTORNEY

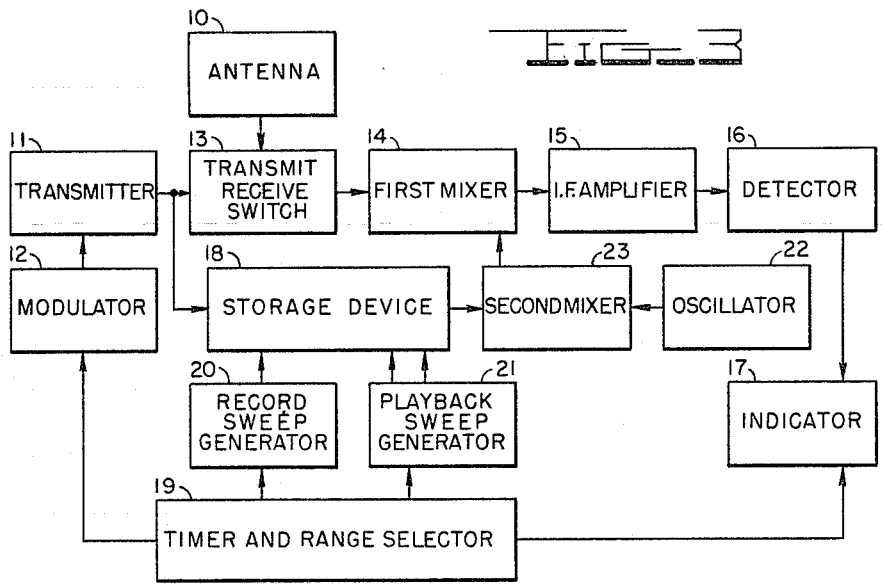
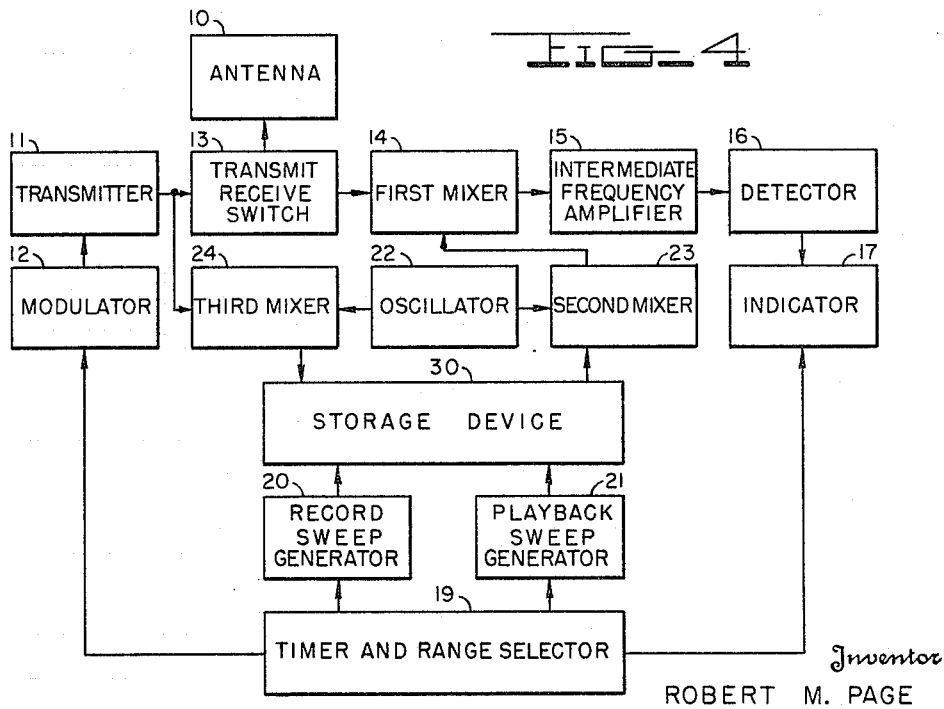

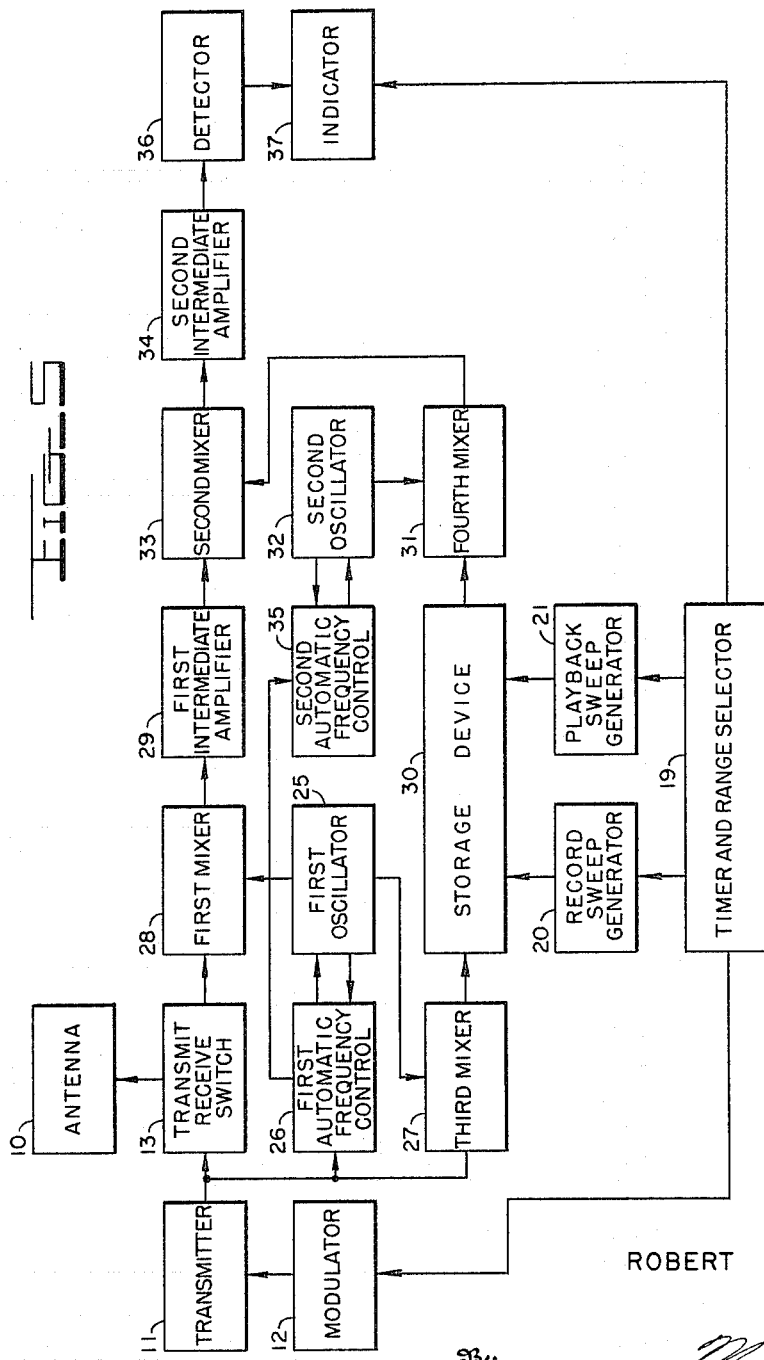

Inventor
ROBERT M. PAGE

United States Patent Office 3,289,201
Patented Nov. 29, 1966

3,289,201
RADAR SYSTEM WITH PHASE COHERENT INTERMEDIATE FREQUENCY SIGNALS
Robert M. Page, Camp Springs, Md.
Filed Sept. 7, 1949, Ser. No. 114,450
8 Claims. (Cl. 343—5)

The invention described herein may be manufactured and used by or for the Government of the United States of America for governmental purposes without the payment of any royalties thereon or therefor.

This invention relates to radar systems in general and, in particular to a radar system in which frequency modulation of the signal produced by the transmitter is made relatively ineffective on the intermediate frequency signal produced at the receiver upon reception of echo signals returned by distant objects.

In conventional radar systems, pulse type operation is normally utilized. Basically such a conventional system comprises a transmitted which generates pulses of radio frequency energy having selected characteristics of radio frequency, duration and repetition frequency of pulses. This energy is emitted by a suitable antenna system and travels out at the speed of light in directions controlled by the characteristics and orientation of the antenna. As the energy travels out it may encounter objects which reflect a portion thereof. This reflected energy is intercepted at the radar antenna system, amplified in a superheterodyne receiver and delivered to a time measuring indicator which determines the time between the generation of a pulse of energy by the transmitter and the reception of a part of that energy as returned from a distant object to give an accurate range measurement.

Numerous difficulties are encountered in such a radar system some of which are now described.

A first difficulty is encountered at the outset, the generation of the radio frequency energy by the transmitter. Radar systems operate at high radio frequency, 3,000 megacycles per second being not uncommon. It is very difficult to generate energy of an accurately controlled frequency throughout the entire duration of each individual pulse of energy at such a high frequency. On the other hand, superheterodyne receivers of necessity employ a relatively low intermediate frequency as obtained by heterodyne action of the return transmitter energy with a local oscillator signal differing in frequency from the transmitter radio frequency by the amount of the intermediate frequency. It is apparent that a variation of say 3 megacycles in the frequency of either transmitter or receiver oscillation generator will produce a percentage variation in intermediate frequency at the receiver greater than the one-tenth of one percent variation by a factor equal to the ratio of the transmitter frequency to the intermediate frequency. Variations of this and an even greater magnitude are quite commonly experienced during individual pulse signals due to transmitter power supply variations or just the fact that the first few cycles of transmitter operation when pulsed are not at the resonant frequency attained after the oscillations are well started. Other variations are introduced as a result of uneven heating of the receiver local oscillator or of the transmitter itself, pulling of the transmitter frequency as a result of varying load produced by objects in close proximity to the antenna or a mismatch in the transmission line between receiver or transmitter and the antenna.

For certain types of operation it may be desirable to maintain "coherence" between successive pulses as they appear in the receiver intermediate frequency amplifier. Such coherence may be explained as a condition in which all signals returned from a selected range start at the same phase angle in the intermediate frequency signal and can be obtained only when the receiver local oscillation used for mixing is at the same phase of its cyclic operation each time a return signal is received. It can be appreciated that such a condition would rarely ever occur with even a highly stable continuously operative receiver local oscillator unless some provision for synchronization with each transmitted pulse is made.

It is accordingly an object of the present invention to provide a radar system in which each individual transmitted pulse is stored and later reproduced and mixed with desired echo signals to obtain intermediate frequency signals of high stability.

Another object of the present invention is to provide a method of producing receiver local oscillations which follow variations in the frequency of a transmitter operatively associated therewith.

Another object of the present invention is to provide a method and means of producing receiver local oscillations in which radio frequency (phase) coherence is maintained in the intermediate frequency signals.

Another object of the present invention is to provide a method and means of reducing the noise produced by radar receivers as a result of continuous local oscillator operation.

Another object of the present invention is to provide method and means of generating receiver local oscillations which contain the same modulation characteristics as the transmitted signal.

Another object of the present invention is to provide method and means of producing pulse phase coherence of received signals at a receiver intermediate frequency.

Other and further objects and features of the present invention will become apparent upon a careful consideration of the accompanying drawings and detailed description.

FIG. 1 shows in block form a system illustrative of the principles of the present invention.

FIGS. 2, 3, 4 and 5 show in block form variant arrangements of the apparatus of the present invention.

Figure 6:
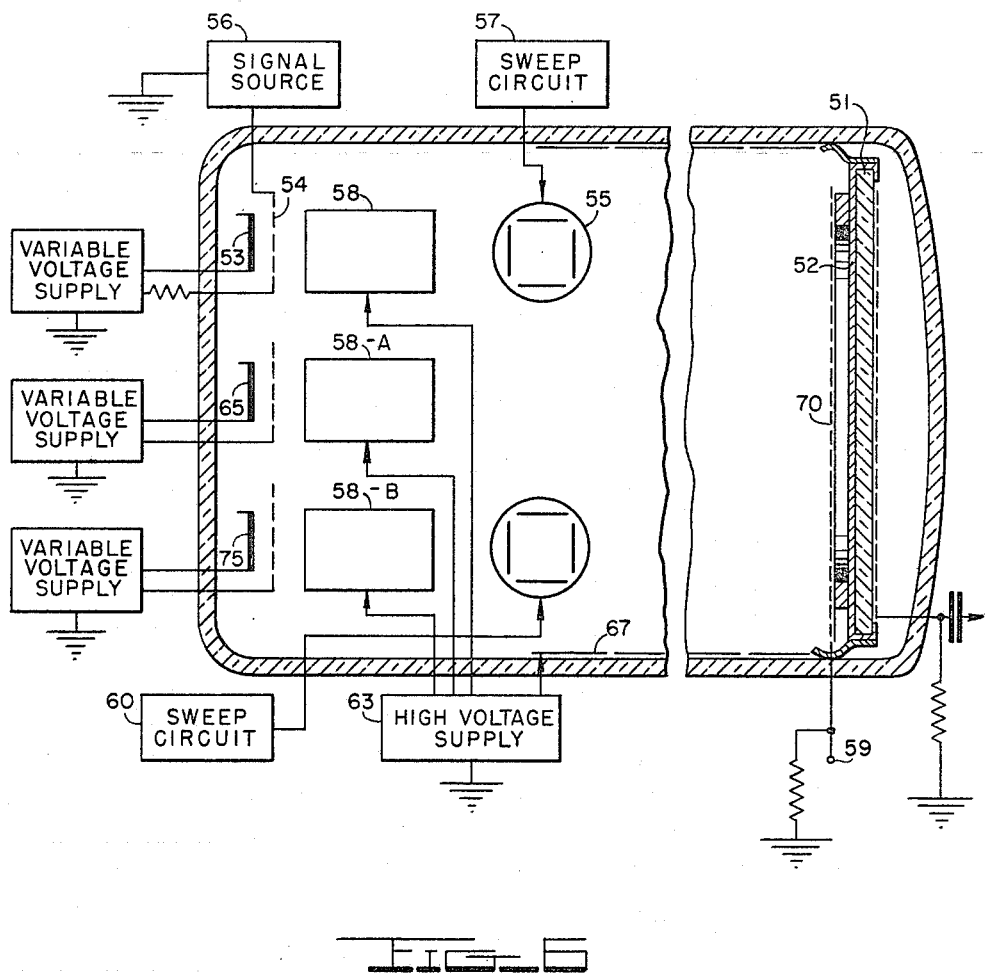
FIG. 6 shows features of a storage tube of a general type suitable for certain phases of the invention.

In accordance with the basic concepts of the present invention, a novel radar system is provided in which the signal generated by the radar transmitter itself is recorded or otherwise stored and then played back in time coincidence with the receptio nof echo energy returned by distant objects at selected range. The echo energy and the played back transmitted signal are mixed and obtained as an intermediate frequency signal for amplification and indication in conventional radar fashion. The several embodiments of the invention show various ways in which the transmitted signal may be stored and played back to obtain a desired intermediate frequency signal. With the intermediate frequency signal thus obtained, the conventional continuously operative receiver local oscillator is not required. Frequency instability of the transmitter during individual pulses can be completely eliminated, whereas instability from pulse to pulse has a much reduced effect on the frequency of the intermediate signal because identical variations will be present in the transmitted and played back signals. Therefore a transmitter pulse to pulse frequency variation of one-tenth of one percent would produce a similar one-tenth of one percent variation in the intermediate frequency signal.

With particular reference now to FIG. 1, the basic features of the present invention are shown in block form. The system shown comprises many elements found in conventional radar systems such as the antenna 10, the transmitter 11, the modulator 12, the transmit-receive switch 13, mixer 14, intermediate frequency amplifier 15, detector 16 and indicator 17. In addition the playback control or range selector 19 is a component of conventional radar gated receiver circuits in which a pulse signal produced a selected instant of time after the production of each pulse of energy by transmitter 11 is employed to render the receiving equipment sensitive to echo signals returned from a selected range. Notoriously absent in this system however is any semblance of a continuously operative receiver local oscillator which conventionally supplies a signal to mixer 14 for heterodyne action therein with return echo signals. In place of the local oscillator is the storage device 18. The storage device receives radio frequency energy during each pulse produced by the transmitter being loosely coupled thereto, stores it for a short period of time, then as controlled by the range selector of the playback control 19, delivers it at such an instant of time as to coincide with the echo energy returned by a distant object at a selected range from antenna 10. Mixer 14 thus combines echo energy with playback transmitter energy to obtain an intermediate frequency signal which is applied to the intermediate frequency amplifier 15.

Various ways of handling the energy which is stored and reproduced are shown in FIGS. 2 through 5. Basically they are the same; however, certain operations may be performed on or with the stored energy to make it particularly useful for various applications and frequencies.

FIG. 2 shows more fully a manner of handling the stored signals. Components are numbered as previously described in connection with FIG. 1, however the blocks 20 and 21 have been added. The storage device 18 shown has characteristics suitable to permit cycle-by-cycle storage of the radio frequency signal produced by the transmitter. A storage tube or memory tube suitable for operation at the frequencies involved would be typical. Several such tubes are known in the art. For example, the storage tube described in copending application Serial No. 768,790, filed August 15, 1947, now U.S. Patent No. 2,813,998, in the name of A. V. Haeff, or in the September 1947 issue of "Electronics beginning on page 80, would be suitable for certain frequencies. Other types of storage tubes suitable for operation at microwaves are at present under development.

FIG. 1 of the Haeff application has been included as FIG. 6 of this application to illustrate the general mechanism of signal storage and playback. This tube has an insulator plate 51 with an active surface 52 placed thereon. Typically, the plate may be of glass and the active surface distributed willemite particles.

An initial charge distribution pattern representative of the transmitter pulse may be placed on the active surface 52 by an electron gun including cathode 53. The beam of this gun may be controlled by grid 54 and deflection means 55 under signals supplied from signal source 56. Source 56, in the case of FIG. 1 may correspond to the transmitter 11. The beam is focused by a conventional lens electrode system shown diagrammatically at 58, for which a high voltage supply 63 is provided. The main tube anode 67 coated on the interior of the envelope, is also energized by supply 63.

Signals placed on the active surface 52 are maintained thereon by delivering low velocity electron thereto from an electron gun including the cathode 65 and focusing lens system 58–A.

Screen 70 possessing close spacing such as 200 mesh per inch collects secondary electrons emitted from points of positive charge on the active surface. These electrons are emitted from the surface 52 upon bombardment by playback scanning electrons from a playback electron gun including cathode 75 and focusing lens system 58–B. This playback scan is controlled by the sweep circuit 60. Output signals produced from the secondary emission current to screen 70 are obtained at terminal 59 and represent the output signals delivered from the storage device 18 of FIG. 1 to mixer 14. Sweep circuit 57 corresponds to the record sweep generator 20 of FIG. 2 whereas sweep circuit 60 corresponds to the playback sweep generator 21.

Erasure of the stored signals is accomplished by diminishing or terminating the holding beam from cathode 65.

The radio frequency signal generated by the transmitter 11 is placed in the storage device coupled thereto as with a sweep signal at a certain linear rate produced by the record sweep generator 20. The record sweep signal produced by generator 20 is timed to start a cycle of operation coincidently with the start of each transmitter pulse as controlled by the modulator 12. Subsequently, after a time lapse as controlled by the range selector or playback control 19, a signal is delivered to the playback sweep generator 21 which then starts the generation of a playback sweep signal similar to the record sweep signal produced by record sweep generator 20, differing therefrom only slightly as in the velocity sweep of the storage device. Such a velocity difference is employed in the apparatus of FIG. 2 so that the stored signal, recorded at the frequency of the transmitter signal will be "swept over" or played back at a slightly different velocity than recorded, typically slower. Thus the played-back signal will be different in radio frequency from the transmitted signal and consequently from the echo signal by a chosen amount. This difference will appear in the output of the mixer 14 as the intermediate frequency signal for delivery to the intermediate frequency amplifier 15. The The frequency of the difference signal can quite easily be set by selection of the velocity sweep of the storage device in the record and playback phases of operation. Thus where the intermediate frequency is a selected value, the difference in the velocity of sweep during recording and during playback is set to produce the selected value as a difference signal. Following the playback of the recorded signal the storage device may be cleared, if required, by a separate signal of suitable characteristics typically obtained from the playback sweep generator 21. Such a clearing signal will be employed with certain types of storage devices, however, it is not necessary with all types since with some devices the playback operation simultaneously clears the storage devices as is the case with conventional television pick-up tubes.

It is to be appreciated, however, that although the record sweep generator 20 and the play back sweep generator 21 are herein shown separately it is entirely possible to combine the two into one unit wherein the characteristics of the signal produced thereby for record sweep and play back sweep may be altered electronically as by the variation of potential at a control element of an electron tube.

Transmitter frequency variations during individual pulses are present in the recorded signal and also appear in the play back signal, however, practically the same variations are present in both so that actual variations in the intermediate frequency signal are negligible. Pulse to pulse frequency variation in the transmitter or in the storage and playback sweeps will appear in the intermediate frequency on a percentage basis. It is to be noted that in conventional radar systems employing a local oscillator, variations of the local oscillator frequency or the transmitter frequency appear in the intermediate frequency as the same actual amount, not as the same percentage.

With somewhat additional circuit complexity, the effect of transmitter frequency variations on receiver intermediate frequency can be completely eliminated. The way in which this is accomplished is shown in FIG. 3 to which reference is now had. Basically FIG. 3 is the same as FIG. 2 in all respects except the manner of recording and playing back the transmitted signal. A minor difference also exists in that the timer and range selector 19 controls the operation of the modulator 12 and the indicator 17 but this difference is shown merely for convenience not for necessity. Actually it makes no difference as regards signal storage equipment which method of keying or modulation control of the transmitter is employed.

In the apparatus of FIG. 3, the storage of a part of the transmitter signal in storage device 18 at the frequency of the transmitter is controlled by the record sweep generator 20 and the play back of this signal by the play back sweep generator 21. Both record and play back operations are initiated by signals from the timer and range selector 19 as is operation of the modulator 12 and indicator 17.

In distinction to the apparatus of FIG. 2, the play back sweep generator 21 produces a play back sweep signal of velocity characteristics identical to those of the record sweep signal, differing therefrom only in the time of initiation as controlled by the timer and range selector 19. Thus the play back signal has the same frequency and frequency variation characteristics as the transmitter signal at all equivalent portions of each individual pulse. Again it is to be appreciated that the record sweep generator 20 and the play back sweep generator 21 may be combined, and that clearing of the storage device 18 if not produced by the play back sweep itself may be accomplished by a separate clearing signal delivered thereto as from the play back sweep generator 21 upon conclusion of each play back sweep.

The intermediate frequency signal is derived through the operation of a low frequency oscillator 22 and second mixer 23. Oscillator 22 operates preferably at the frequency of the intermediate frequency amplifier 15. For a high degree of stability it is desirable that the oscillator 22 posses a highly stable nature which may be assisted by crystal control thereof.

Second mixer 23 combines the played back transmitted signal and the signal from oscillator 22 to obtain sum and difference signals which are above and below the played back signals by an amount equal to the frequency of oscillator 22. The sum and difference signals are applied either together or with the attenuation of one to the first mixer 14 for heterodyne action with echo signals returned from distant objects. Resultant to the second mixing operation a beat signal is obtained at the frequency of the oscillator 22 which as described is the frequency of the intermediate frequency amplifier 15.

With this system of FIG. 3 it is seen that actual cycle by cycle frequency variations are identical in the return echo signal and the correspondingly timed portions of the signal mixed therewith.

Further circuit variations of the devices of FIGS. 2 and 3 are shown in FIGS. 4 and 5 and are intended primarily to illustrate the applicability of the principles of the present invention to the recording of radio frequency signals which are so high in frequency that direct cycle by cycle storage thereof is not practical. FIG. 4 employs a storage device 30 together with a record sweep generator 20 and a playback sweep generator 21 in which record and playback operations take place at different velocities as in FIG. 2. FIG. 5 on the other hand employs a storage device 30 with a record sweep generator 20 and a playback sweep generator 21 which operate at the same velocity characteristics as in FIG. 3. The basic difference between the modified FIGS. 4 and 5 and the basic apparatus of FIGS. 2 and 3 lies in the provision made for mixing the transmitter signals with the signal from a stable continuously operative oscillator to obtain a lower frequency signal which is more favorable for recording in the storage device 30. With particular reference now to FIG. 4 a stable local oscillator signal is provided by oscillator 22. Oscillator 22 of FIG. 4 operates at a much higher frequency than the oscillator of a corresponding number in FIG. 3 and it is desirable that this oscillator be of a highly stable nature, possessing negligible frequency variation in the interval between successive pulses. Oscillator 22 supplies a signal to third mixer 24, which also receives a signal from transmitter 11. Conventional mixing action by third mixer 24 produces a difference frequency signal at a frequency lower than the output frequency from the transmitter, which is more suitable for storage by the storage device 30 but which still possesses the same frequency variation characteristics as the transmitter 11. It is desirable that the bandwidth capabilities of the storage device 30 and associated mixed circuits be comparable to the bandwidth of the transmitted signal.

Recording of the signal on storage device 30 is controlled by record sweep generator 20 at a selected velocity whereas the playback of the stored energy is produced at a subsequent instant of time and at a different velocity as controlled by playback sweep generator 21 in the same manner as in the apparatus of FIG. 2.

The playback signal from the storage device 30 is applied to the second mixed 23 where it is combined with the signal from oscillator 22 to obtain a sum frequency for delivery to the first mixer 14 for combination with echo signals. Combined signals resulting are applied to intermediate frequency amplifier 15 for amplification, then to detector 16 where they are obtained as video frequency pulse type signals for utilization in a conventional radar indicator 17.

The apparatus of FIG. 5 employs the principles of the present invention in a radar system possessing a high degree of stability and improved response to very weak signals.

This improved response is in large part due to the reduction in intermediate frequency bandwidth made possible by the high degree of stability of intermediate frequency signal in the apparatus of the present invention. To assist in bandwidth reduction as well as provide signals of the type desirable in certain forms of radio equipment a double superheterodyne circuit is employed. In this circuit as with the previous circuits phase coherence between repetitive pulses is maintained which means that each pulse in a narrow band intermediate frequency amplifier resulting from an echo signal returned at a fixed range with a fixed range setting of the selector 19 will start with the same phasing, not at a random phasing. Coherence of this type permits integration or averaging from pulse to pulse and an improvement in the signal to noise ratio because noise signals, randomly occurring, do not possess such coherence. It should be noted however that coherence is inherent in apparatus of all FIGS. 1 through 5. The system of FIG. 5 is particularly suitable for very long duration pulses where the frequency spectrum of the pulse is narrow relative to the modulation bandwidth of the transmitter.

To provide the second intermediate frequency signals for such narrow band operation, play back signals from storage device 30 are delivered to fourth mixer 31 wherein they are combined with signals from a second oscillator 32 to produce a signal which upon combination with first intermediate frequency signals from first intermediate frequency amplifier 29 in second mixer 33 produces the second intermediate frequency signal at a lower frequency. Intermediate frequency amplifier 29 receives signals from first mixer 28 containing all the modulation characteristics of the transmitted signal as a result of the combination therein of the signals from first oscillator 25 with return signals picked up by antenna 10.

The second intermediate frequency signal with transmitter modulation characteristics exclusive of the pulse spectrum removed is applied to the second intermediate frequency amplifier 34 for selective narrow band amplification. For example if a 100 microsecond pulse is used intermediate frequency amplifier 34 need have a bandwidth of only 10 kilocycles per second, whereas the original transmitter modulation bandwidth may be hundreds or even thousands of kilocycles.

The first automatic frequency control 26 includes a mixer to combine signals from the first oscillator 25 with signals from the transmitter 11, a discriminator to derive D.-C. output signals in dependency on the combined signals, and an integrating circuit to "average out" the discriminator output signals. The integrated signal thus obtained is employed to adjust the frequency of the oscillator 25 from a reactance tube incorporated in either block 25 or 26 so that a selected average frequency difference between transmitter 11 and first oscillator 25 is obtained. Such automatic frequency control systems are well known in radar apparatus. The second oscillator 32 is controlled in average frequency by the second automatic frequency control 35. Automatic frequency control 35 is similar to the first automatic frequency control 26, differing only in frequency of input signals. It receives signals from second oscillator 32 and mixer output signals at the frequency of the first intermediate frequency amplifier 29 from the mixer of first automatic frequency control 26 and supplies an integrated control signal to oscillator 32 to maintain the latter at a constant average frequency difference with respect to the first intermediate frequency signal so that high stability with coordination between the recorded signals and the signals delivered to the second mixer 33 from first intermediate frequency amplifier 29 is maintained. Oscillator 32 operates nominally at the frequency of the second intermediate amplifier 34. Alternately oscillator 32 may be controlled from the output of amplifier 34 whereas in some cases the automatic control of this oscillator may be eliminated entirely.

Output signals from the second intermediate frequency amplifier 34 are detected in a conventional manner in detector 36 and applied to indicator 37 which is also a conventional radar component.

In the apparatus of FIG. 5 recording of the transmitter signal does not take place at the frequency of the transmitter 11 as in the parent circuit of FIG. 3. Recording takes place as with the circuit of FIG. 4 at a lower frequency more suitable for handling by the storage device 30 when the transmitter frequency is very high. To obtain this low frequency the transmitter signal is combined with a first oscillator signal from controlled oscillator 25 in third mixer 27 prior to delivery to the storage device 30. As a result of the operation of the automatic frequency control 26, the average frequency of the signal recorded by storage device 30 will be constant, however rapid variations above or below this constant value responsive to variations in the frequency of the transmitter 11 will still be recorded as before by the storage device 30.

Recording of the signals by storage device 30 is controlled by the recording sweep generator 20 whereas play back is controlled at the same rate as recorded by the play back sweep generator 21. Thus as with the circuit of FIG. 3, play back sweep generator 21 and record sweep generator 20 produce sweep signals having identical velocity characteristics and may be combined into one apparatus.

Discussion thus far, particularly with respect to the circuit of FIG. 5, has been directed mainly to operation with zero range rate, that is where both the radar system and target are stationary or moving in the same direction and velocity, where Doppler effect and consequent shift of frequency of return energy from transmitted energy is negligible. Since it is desirable to operate where the range rate may be other than zero, some Doppler compensation must in general be introduced. A very effective manner of compensation, which provides true correction throughout the radar pulse, is in the play back rate, produced typically in the apparatus of FIG. 5, by sweep generator 21. Thus if the target and radar system were in relative motion toward each other so that the return energy is at a frequency higher than emitted, the playback sweep generator 21 can be adjusted to produce a scan of the stored signal at a faster velocity than recorded so that the playback signal delivered from storage device 30 is of a higher frequency than the signal stored therein. The greater velocity of playback corresponds to a greater velocity of reception of information from target, thus preserving the identity of modulation characteristics between echo and reproduced signal.

Another manner of introducing this correction is by way of the operation of the second oscillator 32 which may also be changed in frequency to deliver a signal which, at mixer 33, will compensate for Doppler frequency shift of return energy.

It is particularly with an apparatus such as that of FIG. 5 employing a narrow bandwidth second intermediate frequency amplifier 34 that Doppler effect may assume importance. In FIG. 5, for example, a typical bandwidth of intermediate frequency amplifier 29 might be 2 megacycles per second. With such a bandwidth, a 6000 cycle per second Doppler shift (3000 megacycles per second radio frequency, 600 miles per hour range rate) is of course negligible. Such a 6000 cycle Doppler shift may not be negligible at second intermediate frequency amplifier 34.

Although certain specific embodiments of this invention have been herein disclosed and described, it is to be understood that they are merely illustrative of this invention and modifications may, of course, be made without departing from the spirit and scope of the invention as defined in the appended claims.

What is claimed is:

1. In a radio echo system including a transmitter for periodically emitting energy pulses and a receiver for reflections thereof from remote objects, a storage means for retaining the phase and frequency characteristics of the transmitted energy pulses, a control circuit for reproducing the retained energy pulses in coincidence with the return of an echo signal from a selected range, means for altering the frequency characteristics of the reproduced energy pulses to produce a resultant signal and means for mixing the return echo energy pulses and the resultant signal to obtain a carrier signal of selected frequency.

2. In an electrical signal device having a transmitter and receiver wherein energy emitted by the transmitter and returned by an object spaced therefrom is taken by the receiver and analysed in time occurrence with respect to emitted energy, cathode ray tube storage means for retaining a part of the transmitter energy, control means for said storage means connected to the receiver for initiating the delivery of the retained transmitter energy to the receiver in coincidence with the receipt of return signals from a selectable range at the receiver, means for altering the frequency characteristics of the retained transmitter energy delivered by said storage means to produce a resultant signal and mixing means in said receiver combining the resultant signal thus delivered and return signals to obtain a receiver intermediate frequency signal at a selected carrier frequency.

3. In an electrical signal device having a transmitter and receiver wherein energy emitted by the transmitter and returned by an object spaced therefrom is taken by the receiver and analysed in time occurrence with respect to emitted energy, storage means retaining a part of the transmitter energy, control means for said storage means for delivering the retained transmitter energy at a different rate than stored to the receiver in coincidence with the receipt of return energy from a selected range at the receiver, and mixing means in said receiver combining the retained transmitter energy thus delivered and return signals to obtain a receiver intermediate frequency signal.

4. In an electrical signal device having a transmitter and receiver wherein energy emitted by the transmitter and returned by an object spaced therefrom is taken by the receiver and analysed in time occurrence with respect to emitted energy, signal storage means fed by the transmitter, signal control means for said signal storage means controlling the storage of the transmitter signal as generated at a selected rate and the delivery of the stored signal at a different rate in coincidence with the receipt at the receiver of return energy from a selected range, and mixing means in said receiver combining the retained transmitter energy thus delivered and return signals to obtain a receiver intermediate frequency signal.

5. In an electrical signal device having a transmitter and receiver wherein energy emitted by the transmitter and returned by an object spaced therefrom is taken by the receiver and analysed in time occurrence with respect to emitted energy, storage means for retaining a part of the transmitted energy, first control means for said signal storage means controlling the storage of the transmitter signal at the time of generation, second control means for said signal storage means controlling the delivery of the stored transmitter signal at a different rate than recorded in coincidence with the receipt at the receiver of returned energy from a selected range, and mixing means in said receiver combining the retained transmitter energy thus delivered and return signals to obtain a receiver intermediate frequency signal.

6. In and electrical signal device having a transmitter and receiver wherein energy emitted by the transmitter and returned by an object spaced therefrom is taken by the receiver and analysed in time occurrence with respect to emitted energy, storage means for retaining a part of the transmitter energy, control means for said storage means delivering the stored transmitter energy a selected time instant after its production, frequency changing means receiving the delivered stored energy altering the frequency thereof by a selected frequency, and mixing means in said receiver combining the frequency altered signals from the last named means with return signals to produce an intermediate frequency signal at the aforementioned selected frequency.

7. In an electrical signal device having a transmitter and receiver wherein energy emitted by the transmitter and returned by an object spaced therefrom is taken by the receiver and analysed in time occurrence with respect to emitted energy, storage means for retaining a part of the transmitter energy at a frequency reduced therefrom, playback control means for said storage means operative to deliver stored transmitter energy in coincidence with the receipt of return energy from selected range, means for altering the frequency characteristics of the retained transmitter energy delivered by said storage means to produce a resultant signal, and mixing means in said receiver responsive to returned signals and delivered resultant signal to provide intermediate frequency signals at a selected carrier frequency.

8. In an electrical signal device having a transmitter and receiver wherein energy emitted by the transmitter and returned by an object spaced therefrom is taken by the receiver and analyzed wtih respect to emitted energy, storage means for retaining a part of the transmitter energy, control means for said storage means connected to the receiver for initiating the delivery of the retained transmitter energy to the receiver in coincidence with the receipt of return signals, means for altering the frequency characteristics of the retained transmitter energy delivered by said storage means to produce a resultant signal, mixing means in said receiver combining the resultant signal thus delivered and return signals to obtain a receiver intermediate frequency signal at a selected carrier frequency, and an intermediate frequency amplification system connected to the output of said last named means operative to selectively amplify the intermediate frequency signals and reject signals of other frequencies.

References Cited by the Examiner
UNITED STATES PATENTS

| | | | |
|---|---|---|---|
| 2,407,294 | 9/1946 | Shockley | 343—13 |
| 2,408,742 | 10/1946 | Eaton | 343—9 |
| 2,467,670 | 4/1949 | Hershberger | 343—8 |

CHESTER L. JUSTUS, *Primary Examiner.*

SIMON YAFFEE, ARTHUR GAUSS, NORMAN H. EVANS, *Examiners.*

W. W. BURNS, R. D. BENNETT, *Assistant Examiners.*